(12) United States Patent
Hasegawa (10) Patent No.: US 9,022,281 B2
(45) Date of Patent: May 5, 2015

(54) COMMODITY SALES DATA PROCESSING APPARATUS, CHECKOUT SYSTEM AND CONTROL METHOD

(75) Inventor: Keiichi Hasegawa, Koto-ku (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/600,435

(22) Filed: Aug. 31, 2012

(65) Prior Publication Data

US 2013/0056532 A1   Mar. 7, 2013

(30) Foreign Application Priority Data

Sep. 6, 2011   (JP) ................. 2011-193650

(51) Int. Cl.
| | | |
|---|---|---|
| G06F 17/00 | (2006.01) | |
| G06K 15/00 | (2006.01) | |
| G08B 13/14 | (2006.01) | |
| G07G 1/00 | (2006.01) | |
| G06Q 20/20 | (2012.01) | |

(52) U.S. Cl.
CPC ............ *G07G 1/0063* (2013.01); *G06Q 20/208* (2013.01)

(58) Field of Classification Search
CPC ... G07G 1/0036; G07G 1/0045; G07G 1/009; G06Q 20/208; G08B 13/2411; G08B 13/2477; G08B 13/242
USPC .............. 235/383, 375, 492, 451, 385, 454; 340/572.3, 572.5, 572.7, 572.4
See application file for complete search history.

(56) References Cited

U.S. PATENT DOCUMENTS

| 5,574,431 A | 11/1996 | McKeown et al. |
|---|---|---|
| 7,446,646 B2 * | 11/2008 | Huomo ........................ 340/10.1 |
| 8,289,166 B2 | 10/2012 | Fujishiro et al. |
| 8,381,979 B2 * | 2/2013 | Franz ............................ 235/435 |
| 2009/0066516 A1 * | 3/2009 | Lazo .......................... 340/572.7 |
| 2011/0080268 A1 | 4/2011 | Kaneko |
| 2013/0278425 A1 * | 10/2013 | Cunningham et al. ..... 340/572.1 |

FOREIGN PATENT DOCUMENTS

| JP | 09-171597 | 6/1997 |
|---|---|---|
| JP | 2010-130457 | 6/2010 |
| JP | 2011-081619 | 4/2011 |

OTHER PUBLICATIONS

Office Action for Japanese Patent Application No. 2011-193650 Dated Sep. 3, 2013, 1 pg.

* cited by examiner

*Primary Examiner* — Michael G Lee
*Assistant Examiner* — Suezu Ellis
(74) *Attorney, Agent, or Firm* — Amin, Turocy & Watson, LLP (57) ABSTRACT

A commodity sales data processing apparatus determines, based on the imaged image of the commodity, whether or not the commodity is provided with an image display element for displaying a specific image representing that the commodity is a commodity adhered with a security tag, if it determines that the commodity is a commodity adhered with a security tag, the processing that the first resonant circuit become unusable for the security tag using the first communication device is carried out, in this state, if the first communication device carries out no communication and the second communication device carries out communication, carries out for shifting the processing of next commodity.

6 Claims, 8 Drawing Sheets

COMMODITY SALES DATA PROCESSING APPARATUS, CHECKOUT SYSTEM AND CONTROL METHOD

CROSS-REFERENCE TO RELATED APPLICATION

This application is based upon and claims the benefit of priority from Japanese Patent Application No. 2011-193650, filed Sep. 6, 2011, the entire contents of which are incorporated herein by reference.

FIELD

Embodiments described herein relate to a commodity sales data processing apparatus, a checkout system and a control method.

BACKGROUND

In supermarket, retail store, department store and other shops, a security store system (e.g. refer to Patent Document 1) of a gate structure is sometimes adopted to prevent thefts and pickpockets.

This security store system is structured as follows: a gate in which a wireless device for realizing a near-distance wireless communication is built is arranged at the entrance/exit of a store, and a security tag is adhered on the commodity displayed in the store as a wireless tag provided with a resonant circuit. When people carrying a commodity adhered with the security tag, that is, a commodity with an effective security tag, passes the gate, the wireless device built in the gate carries out a near-distance wireless communication to make the resonant circuit of the security label resonate to detect a tag signal, then an alarm device configured at a given position sounds an alarm.

In the case where the security store system above is applied, when a commodity is off a checkout counter, a tag signal eliminating signal should be sent to the resonant circuit of the security tag to destroy the resonant circuit so that even if the wireless device built in the gate carries out a near-distance wireless communication, the resonant circuit of the security tag will not resonate to send a tag signal (hereinafter referred to as 'eliminate the security tag').

DETAILED DESCRIPTION

In accordance with an embodiment, a commodity sales data processing apparatus may carry out a sales data processing for a commodity adhered with a security tag which comprises a first resonant circuit configured to receive electric wave of a first frequency to resonate and to send the electric wave of the first frequency and a second resonant circuit configured to receive electric wave of a second frequency to resonate and to send the electric wave of the second frequency.

Moreover, a determination section determines, based on the imaged image of the commodity, whether or not the commodity is provided with an image display element for displaying a specific image representing that the commodity is a commodity adhered with a security tag.

A first communication device may communicate with the first resonant circuit using the first frequency and disenable the first resonant circuit.

A second communication device may communicate with the second resonant circuit using the second frequency.

Thus, when it is determined that the commodity (the object to be processed) is a commodity provided with an image display element, a processing control section disenables, aiming at the security tag adhered on the commodity, the first resonant circuit using the first communication device, in this state, the first communication device carries out no communication and the second communication device carries out communication to process the next commodity.

Figure 1:
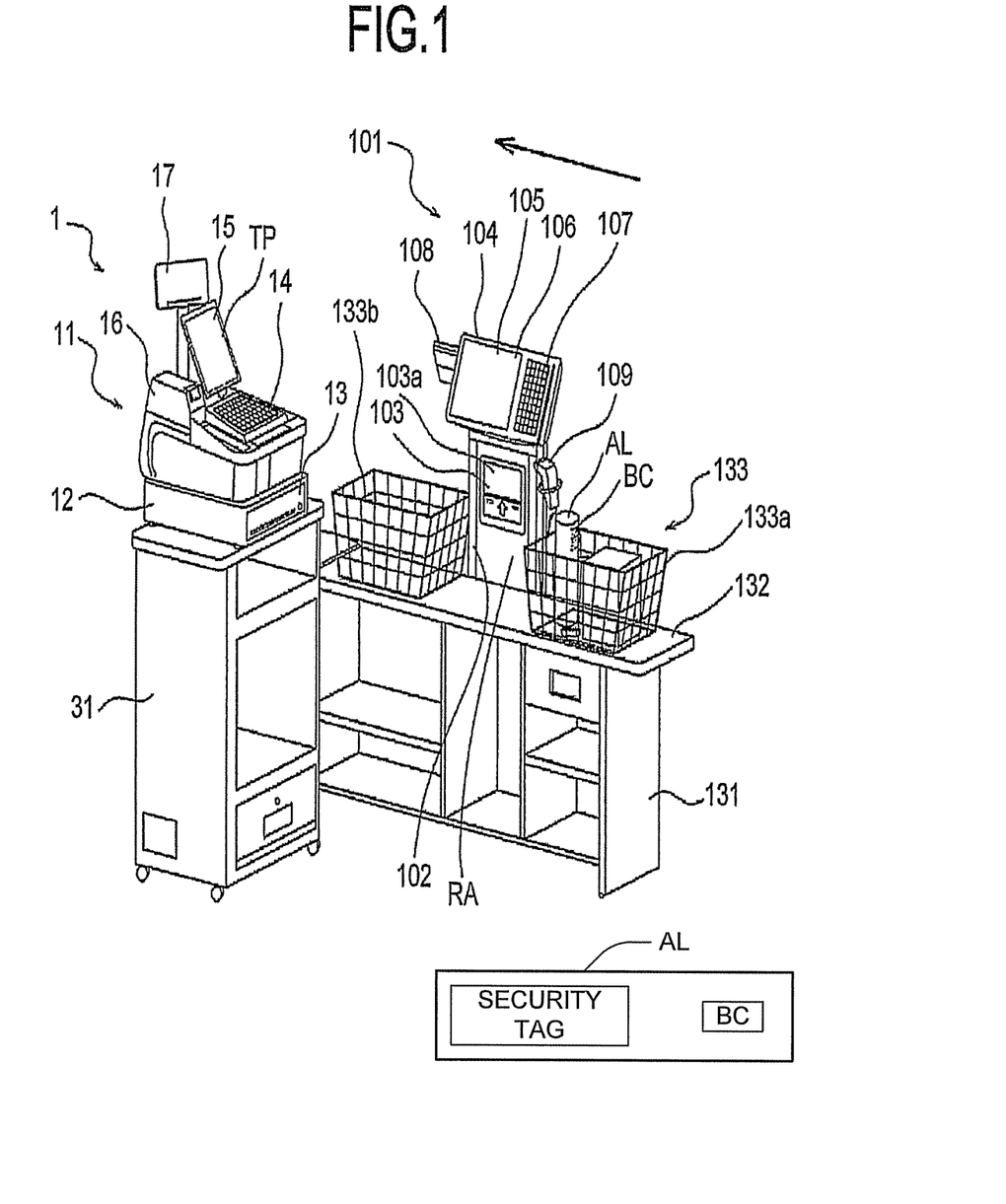
FIG. 1 is an external perspective view of a checkout system provided with a POS terminal and a code symbol reading apparatus.

FIG. 1 is an external perspective view of a checkout system provided with a POS terminal and a code symbol reading apparatus.

The checkout system 1 comprises: a POS terminal 11, which is configured on a checkout counter 31 with a cash drawer 12 spaced therebetween; and a code symbol reading apparatus 101, which is configured to read the code symbol of a specific commodity from an imaged image and is connected with the POS terminal 11 to transmit data freely. Here, the code symbol reading apparatus 101, as stated below, also has the functions of a device capable of communicating with a security tag (refer to FIG. 3) and eliminating the security tag.

In this case, the security tag includes a first resonant circuit resonating at a first frequency f1 and a second resonant circuit resonating at a second frequency f2.

Figure 2:
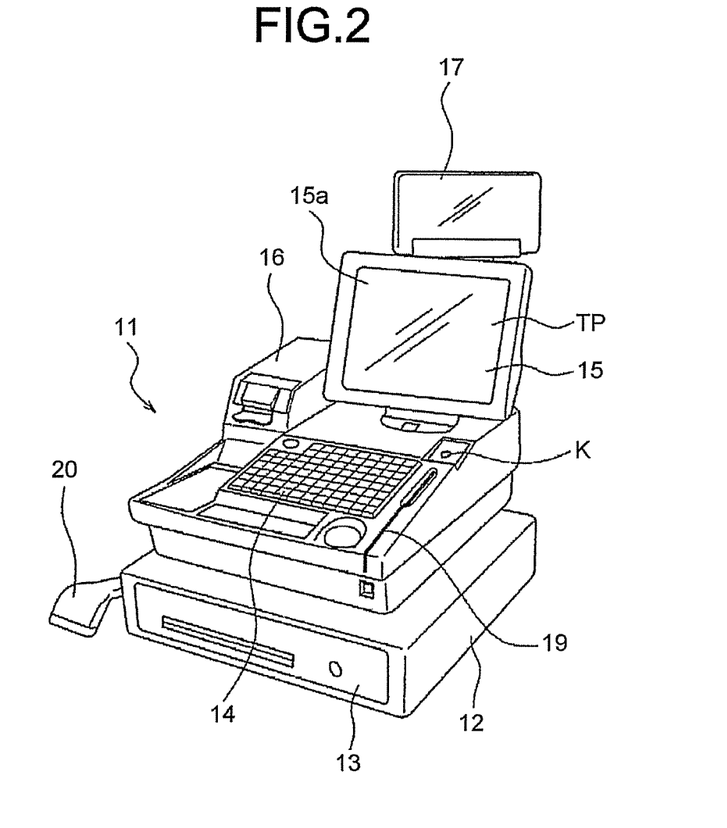
FIG. 2 is an enlarged external perspective view of a POS terminal.

FIG. 2 is an enlarged external perspective view of the POS terminal.

Figure 3:
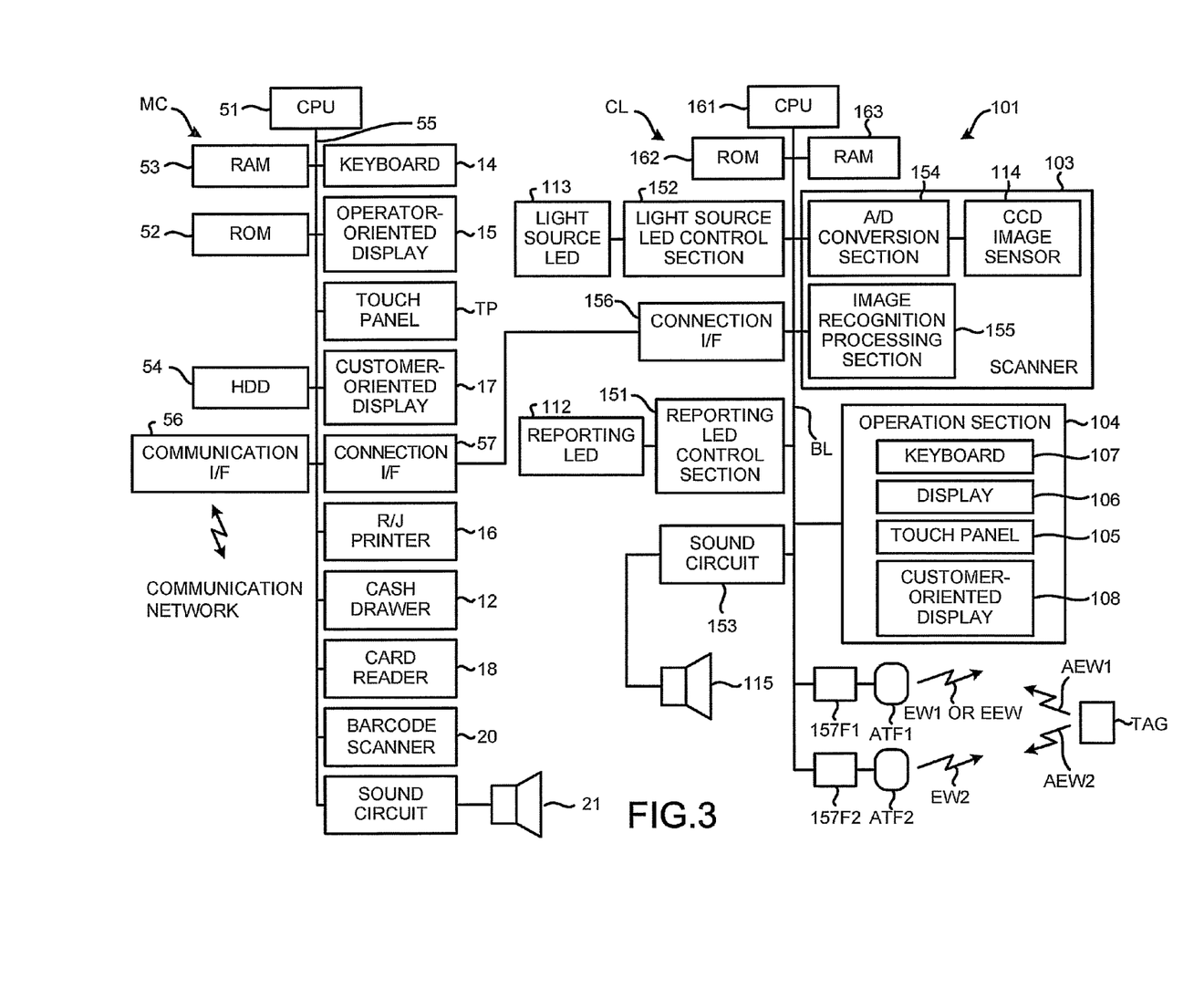
FIG. 3 is a block diagram showing the hardware components of a POS terminal and a code symbol reading apparatus.

FIG. 3 is a block diagram showing the hardware components of the POS terminal and the code symbol reading apparatus.

The POS terminal 11 is held on a cash drawer 12 to control the opening/closing of the drawer 13 of the cash drawer 12. A keyboard 14 and an operator-oriented display 15 are arranged on the right upper portion of the POS terminal 11, and a receipt/journal printer 16 is arranged on the left upper portion of the POS terminal 11.

The operator-oriented display 15 functions as a display section to display information on the display panel 15a thereof, which may be, for example, a liquid crystal display panel. Moreover, a touch panel TP, which is touched to input information, is laminated on the display panel 15a. A vertical customer-oriented display 17 is configured on the upper back portion the POS terminal 11. In FIG. 2, a card reading slot 19 is arranged nearby the right lateral side of the POS terminal 11 to scan a card so that the card reader 18 shown in FIG. 3 can read information from a card.

In FIG. 2, a key K is arranged on the right upper portion of the POS terminal 11 at a position more inward than the card reading slot 19. The key K accepts the insertion and rotation of a user-held key (not shown) to switch the action mode of the POS terminal 11 to 'register', 'calculate', 'check', 'training' and so on. The input of various kinds of information to the POS terminal 11 may be achieved by the keyboard 14 and the touch panel TP which function as an input section.

The POS terminal 11 is connected with a barcode scanner 20 functioning as a code scanner. The barcode scanner 20 optically reads the code symbol, that is, the barcode, printed on a commodity placed on the checkout counter equipped with the POS terminal 11 and analyzes and outputs the commodity code contained in the barcode. The commodity code analyzed and output by the barcode scanner 20 is sent to the POS terminal 11. Thus, like the keyboard 14, the barcode scanner 20 can also function as an input section for inputting information.

The POS terminal 11 comprises a CPU 51 for carrying out various operations to control each other unit, as shown in FIG. 3. The CPU 51 is connected, via a bus line 55, with an ROM 52 for fixedly storing fixed data, an RAM 53 which stores variable data in an updatable manner and functions as a working area, and an HDD 54 in which various computer programs are installed. The computer programs are all or partially copied into the RAM 53 when the POS terminal is activated. The CPU 51 carries out processing according to the computer programs copied in the RAM 53.

The cash drawer 12, the keyboard 14, the operator-oriented display 15, the receipt/journal printer 16, the customer-oriented display 17, the card reader 18 and the barcode scanner 20 are all connected with the CPU 51 via various input/output circuits (not shown) and the bus line 55 and all act under the control of the CPU 51. In addition, the POS terminal 11 further comprises a sound circuit 22 which makes a sound from a loudspeaker 21. The sound circuit 22 is also connected with the CPU 51 via the bus line 55 to act under the control of the CPU 51. A sound synthesizer LSI is carried on the sound circuit 22 to digitalize and amplify a synthesized sound signal and then outputs the amplified digital sound signal from the loudspeaker 21. Thus, by controlling the physical properties of the object with the actions above, each of the CPU 51, the ROM 52 and the RAM 53 enables the computer programs to control the indispensable hardware resource of the object.

The POS terminal 11 has a communication interface 56 connected with a communication network set in a shop provided with the POS terminal 11, the communication interface 56 is also connected with the CPU 51 via the bus line 55. As an example, the computer programs installed in the HDD 54 are downloaded from an upper device via the communication interface 56.

The CPU 51 of the POS terminal 11 carries out processing according to the computer programs copied in the RAM 53. As an example of the processing, the CPU 51 enables the POS terminal 11 to carry out a commodity sales data processing. That means a micro computer MC made up of the CPU 51, the ROM 52 and the RAM 53 functions as a data processing unit for carrying out a commodity sales data processing.

Moreover, a connection interface 57 which transmits data with the code symbol reading apparatus 101 is connected with the bus line 55.

The external structure of the code symbol reading apparatus 101 is described below.

The code symbol reading apparatus 101 is a fixed device fixed on a commodity receiving surface 132 arranged on a long desk-shaped counter 131. A shopping basket 133 for accommodating a commodity AL is held on the commodity receiving surface 132. The shopping basket 133 can be conceptually classified into a first shopping basket 133a which is carried to the commodity receiving surface 132 of the counter 131 with the commodity AL to be purchased by a customer accommodated therein, and a second shopping basket 133b which is spaced from the first shopping basket 133a by the code symbol reading apparatus 101. The first shopping basket 133a is located at the upstream side of a customer flow direction, while the second shopping basket 133b is positioned at the downstream side of the customer flow direction. The customer flow direction is indicated by the arrow shown in FIG. 1.

Seen from the side of the operator, the code symbol reading apparatus 101 is a longitudinal scanner arranged behind the commodity receiving surface 132 of the counter 131. That is, the code symbol reading apparatus 101 has a long narrow rectangular base 102, the front side of which is provided with a scanner 103, and on which an operation section 104 is arranged.

The scanner 103 has a reading window 103a, a CCD image sensor for imaging the commodity AL is built in the reading window 103a at a position facing an imaging area RA in which the commodity (the object to be imaged) is held, the CCD image sensor images the commodity placed in front of the reading window 103a, specifies the commodity using an object recognition technology or a pattern recognition technology, and outputs a corresponding commodity code. The commodity code output from the scanner 103 is sent to the POS terminal 11.

The operation section 104 extends from the front side of the base 102 towards the nearer side shown in FIG. 1, with the front portion thereof inclined downwards. A display 106, the surface of which is laminated with a touch panel 105, is arranged on the operation section 104, and a keyboard 107 having a plurality of key tops arranged in a matrix form is arranged on the right of the display 106. Seen from the side of the operator, a customer-oriented display 108 for providing information for the customer is arranged on the left of and located behind the display operating unit 104.

Besides, the code symbol reading apparatus 101 further comprises a manual scanner 109 serving as a manual barcode scanner for optically reading a barcode serving as a code symbol. The manual scanner 109 is detachably hung on the right of the base 102.

Figure 4:
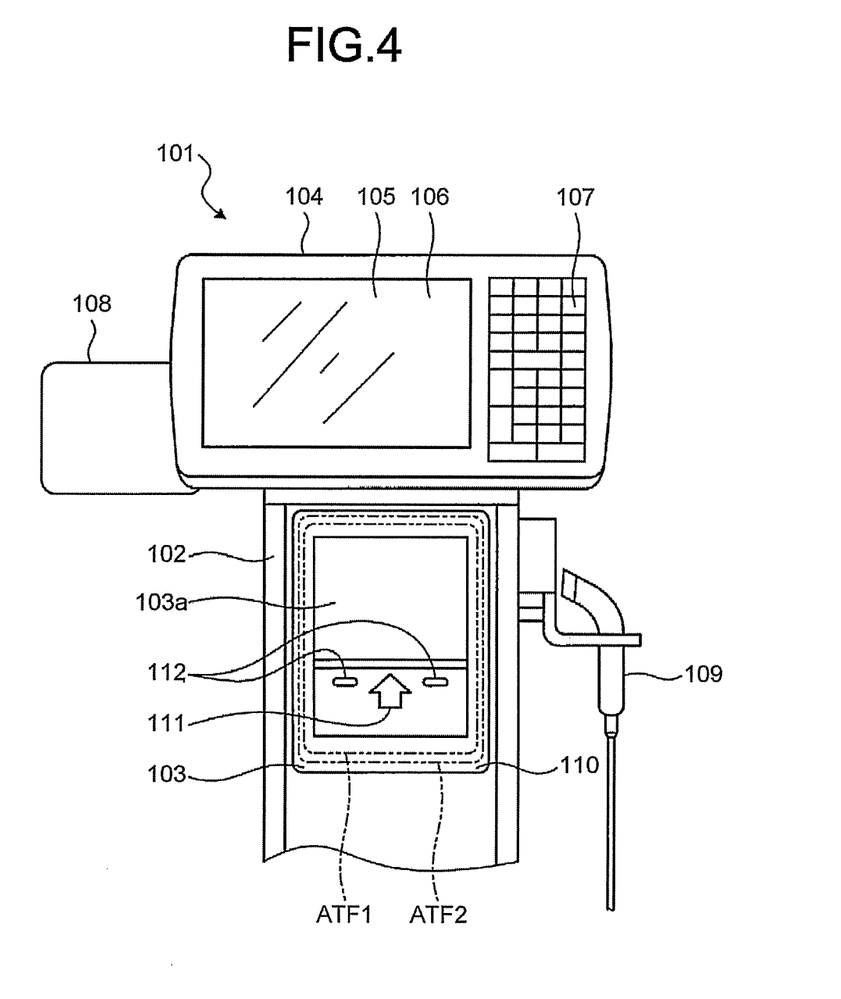
FIG. 4 is a front view of a code symbol reading apparatus.

FIG. 4 is a front view of the code symbol reading apparatus.

As shown in FIG. 4, the scanner 103 of the code symbol reading apparatus 101 has a report area 110 below the reading window 103a. A reading indicator 111 in the shape of an arrow with a white border is displayed in the center of the report area 110 to indicate that the barcode BC printed on the commodity AL should be aimed at the reading window 103a. Moreover, reporting LEDs 112 are configured on the two sides of the reading indicator as reporting light-giving sections, each reporting LED 112 being an LED capable of giving off blue light and right light under the drive of a reporting LED control section 151.

Moreover, a light source LED 113 is built in the scanner 103 at a position more inward than the reading window 103a to illuminate the imaging area RA under the control of a light source LED control section 152. Further, as stated above, a CCD image sensor 114 is built in the scanner 103 at a position more inward than the reading window 103a to image the commodity AL placed in the imaging area RA.

Further, an antenna AT for eliminating a security tag is arranged on the internal periphery of the scanner 103 to send eliminating electric wave for disenabling (eliminating) the security tag.

Next, the internal structure of the code symbol reading apparatus 101 is described with reference to FIG. 3 again.

The code symbol reading apparatus 101 comprises a CPU 161 functioning as an information processing unit for carrying out various operations to control each other unit of the code symbol reading apparatus 101. The CPU 161 is connected, via a bus line BL, with an ROM 162 for fixedly storing fixed data and an RAM 163 which stores variable data in an updatable manner and functions as a working area. The ROM 162 records the computer programs executed by the CPU 161 as instruction set (FormWare). The CPU 161, the ROM 162 and the RAM 163 constitute a control section CL for controlling each unit of the code symbol reading apparatus 101.

The CPU 161 of the code symbol reading apparatus 101 is connected, via various input/output circuits (not shown), with the operation section 104, a reporting LED control section 151 for driving and controlling the report of the reporting LEDs 112 and a light source LED control section 152 for driving and controlling the light source LED 113, each of which acts under the control of the CPU 161. In addition, the code symbol reading apparatus 101 comprises a sound circuit 153 which makes a sound from a loudspeaker 115 and is connected with the CPU 161 via the bus line 55 to act under the control of the CPU 161. A sound synthesizer LSI is carried on the sound circuit 153 to digitalize and amplify a synthesized sound signal and then outputs the amplified sound signal from the loudspeaker 115.

Moreover, the CPU 161 of the code symbol reading apparatus 101 is connected with the scanner 103, which has an A/D conversion section 154 and an image recognition processing section 155 that are connected with the CPU 161 via the bus line BL. The A/D conversion section 154 connected with the CCD image sensor 114 converts the electric signal received from the CCD image sensor 114 to digital image data via an amplification circuit (not shown) and a digital conversion circuit (not shown). The image recognition processing section 155 recognizes the image corresponding to the digital image data, extracts an image equivalent to a code symbol, decodes the image into a commodity code, and outputs the decoded commodity code to the CPU 161.

Meanwhile, the image recognition processing section 155 receives, from the images corresponding to the digital image data, an image representing that the commodity is a commodity adhered with a security tag, and informs the CPU 161 of the content 'the commodity is a commodity adhered with a security tag' if the image representing that the commodity is a commodity adhered with a security tag is contained in the images corresponding to the digital image data.

In this case, any image (a given logo mark or a virtual barcode) that can be printed on the package of a commodity or the surface of a security tag or adhered on a commodity by being adhered on a flag seal (e.g. discount seal) nearby a code symbol representing a commodity code may be used properly as an image representing that the commodity is a commodity adhered with a security tag.

Further, the code symbol reading apparatus 101 has a connection interface 156 which is connected with the connection interface 57 of the POS terminal 11 to transmit data with the POS terminal 11. The connection interface 156, which may be an interface such as USB serial port that can communicate with the connection interface 57 of the POS terminal 11, is connected with the CPU 161 of the code symbol reading apparatus 101 via the bus line BL.

Thus, the code symbol reading apparatus 101 can output the commodity code that is optically read by the scanner 103 using the CCD image sensor 114 and then decoded and output by the image recognition processing section 155 to the POS terminal 11.

In addition, the code symbol reading apparatus 101 comprises: a first communication device 157F1 which transmits, via an antenna ATF1, communication electric wave EW1 of a first frequency f1 for confirming the existence of a security tag and eliminating electric wave EEW of the first frequency f1 for disenabling a security tag, and a second communication device 157F2 which transmits, via an antenna ATF2, communication electric wave EW2 of a second frequency f2 for confirming the existence of a security tag. The first communication device 157F1 and the second communication device 157F2 are connected with the CPU 161 of the code symbol reading apparatus 101 via the bus line BL.

Thus, aiming at the commodity adhered with a security tag that is notified to the CPU 161 by the image recognition processing section 155, the first communication device 157 optically reads, under the control of the CPU 161, a code symbol such as a barcode using the CCD image sensor 114 while detecting the existence of the security tag in a communicable range using the communication electric wave EW1 and disenabling the security tag for the commodity adhered with the security tag using the eliminating electric wave EEW2.

In this case, the effective working range (that is, the security tag disenabling range) of the eliminating electric wave EEW of the first communication device 157F1 is preferably the range in which the CCD image sensor 114 of the scanner 103 can read the code symbol of the commodity or a range equivalent to or slightly wider than a three-dimensional range. At this time, the security tag can be definitely disenabled while the code symbol is read.

Likewise, the security tag disenabling range is preferably a range equivalent to or slightly wider than a three-dimensional range in which the communication electric wave EW1 can communication with the security tag.

In addition, the three-dimensional range in which the second communication device 157F2 can realize a communication using the communication electric wave EW2 is substantially as wide as that in which the first communication device 157F1 can realize a communication using the communication electric wave EW1 and the security tag.

Thus, in the case where the commodity adhered with a security tag is the object the commodity sales data of which is processed, in order to enable the operator to keep the commodity in the effective working range of the eliminating electric wave EEW of the first communication device 157F1 for disenabling the security tag, the CPU 161 notifies the content 'commodity code has been read' given time later, and displays a prompt message 'code symbol (e.g. barcode) has not been read yet, please make the commodity face the reading window'.

The CPU 161 of the code symbol reading apparatus 101 carries out processing in accordance with the computer programs that are recorded in the ROM 162 as instruction set. The CPU 161 enables the code symbol reading apparatus 101 to assist the POS terminal 11 in carrying out a commodity sales data processing.

In the structure above, the operator manually places the commodity AL accommodated in the first shopping basket 133a in a reading area RA by making the code symbol (e.g. barcode) adhered on the commodity AL face the reading window 103a of the scanner 103. At this time, the light source LED 113 gives off light, and the light reflected by the code symbol is imaged by the CCD image sensor 114 and then decoded into a commodity code by the image recognition processing section 155 using an image recognition processing technology such as a target recognition processing or pattern recognition processing. In this way, the operator enables the code symbol reading apparatus 101 to read the commodity code of a commodity adhered with a code symbol.

At this time, the image recognition processing section 155 attempts to extract an image representing that the commodity is a commodity adhered with a security tag from the images corresponding to the digital image data, Then, the CPU 161 is informed of the content 'the commodity is a commodity adhered with a security tag' if the image of the commodity adhered with the security tag is contained in the images corresponding to the digital image data.

Thus, the CPU 161 notifies a notification 'commodity code has been read already' a given time later, and displays, on the display 106, a prompt message 'code symbol (e.g. barcode) has not been read yet, keep the commodity face the reading window please'.

In this way, the operator is aware that the commodity code is not read smoothly and then keeps the commodity facing the reading window, as a result, the CPU 161 of the code symbol reading apparatus 101 enables the first communication device 157F1 to send communication electric wave EW1 to detect whether or not an answering electric wave AEW1 of the first frequency f1 is sent by the security tag.

Likewise, the CPU 161 of the code symbol reading apparatus 101 enables the second communication device 157F2 to send the communication electric wave EW2 to detect whether or not an answering electric wave AEW2 of the second frequency f2 is sent by the security tag.

Sequentially, after receiving the answering electric wave AEW1 of the first frequency and the answering electric wave AEW2 of the second frequency, the CPU 161 of the code symbol reading apparatus 101 determines that the security tag is kept in the effective working range of the eliminating electric wave EEW of the first communication device 157F1 for disenabling the security tag.

Thus, the code symbol is read by the scanner 103 to acquire the commodity code to carry out a sales data processing, and the CPU 161 of the code symbol reading apparatus 101 controls the first communication device 157F1 to send the eliminating electric wave EEW of the first frequency f1.

Moreover, after receiving the answering electric wave AEW2 of the second frequency f2 but no answering electric wave AEW1 of the first frequency f1, the CPU 161 of the code symbol reading apparatus 101 determines that the security tag is disenabled.

Further, after receiving the answering electric wave AEW1 of the first frequency f1 but no answering electric wave AEW2 of the second frequency f2, the CPU 161 of the code symbol reading apparatus 101 determines that the security tag is abnormal.

Then, a notification 'commodity code has been read already' is given, and a prompt message 'code symbol (e.g. barcode) has not been read yet, keep the commodity facing the reading window please' is displayed on the display 106.

In this way, the disenabling (elimination) of the security tag adhered on the commodity the commodity code of which is read is confirmed, and the reading of the commodity code and the disenabling of the security tag can be consequentially carried out at the same time.

Then, the operator places the commodity AL the commodity code of which is read into the second shopping basket 133b. The commodity code read by the code symbol reading apparatus 101 is sent to the POS terminal 11. The CPU 51 of the POS terminal 11 acquires, based on the commodity code, a corresponding unit price from the PLU file that will be described later, and then carries out a settlement amount calculation processing (commodity sales data processing) based on the unit price.

Figure 5:
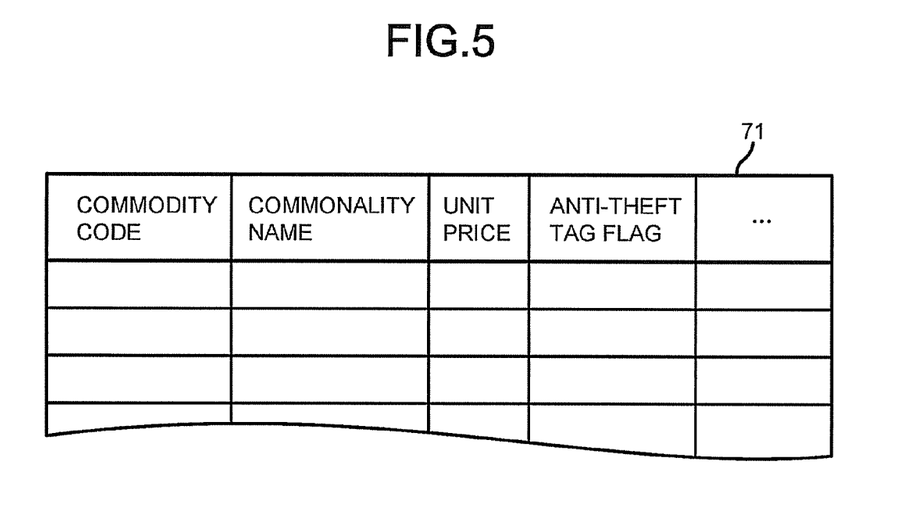
FIG. 5 is a schematic diagram illustrating a PLU file.

A PLU file is described here.

FIG. 5 is a schematic diagram illustrating a PLU file.

The PLU file 71 is stored in, for example, the HDD 54 of the POS terminal 11. As an example, the PLU file 71 is all or partially copied into the RAM 53 from the HDD 54 when the POS terminal 11 is powered on. In the PLU file 71, a commodity code serving as a code for distinguishing a commodity is stored in association with a commodity name (text data), a unit price (numerical data) and a security tag flag (numerical data). As an example, a security tag flag 'NULL code' means that there is no security tag, and a security tag flag '1' means that there is a security tag. The existence of a security tag means that a security tag (not shown) is adhered on a commodity specified by a commodity code.

The commodity sales data processing is described below in detail.

Figure 6:
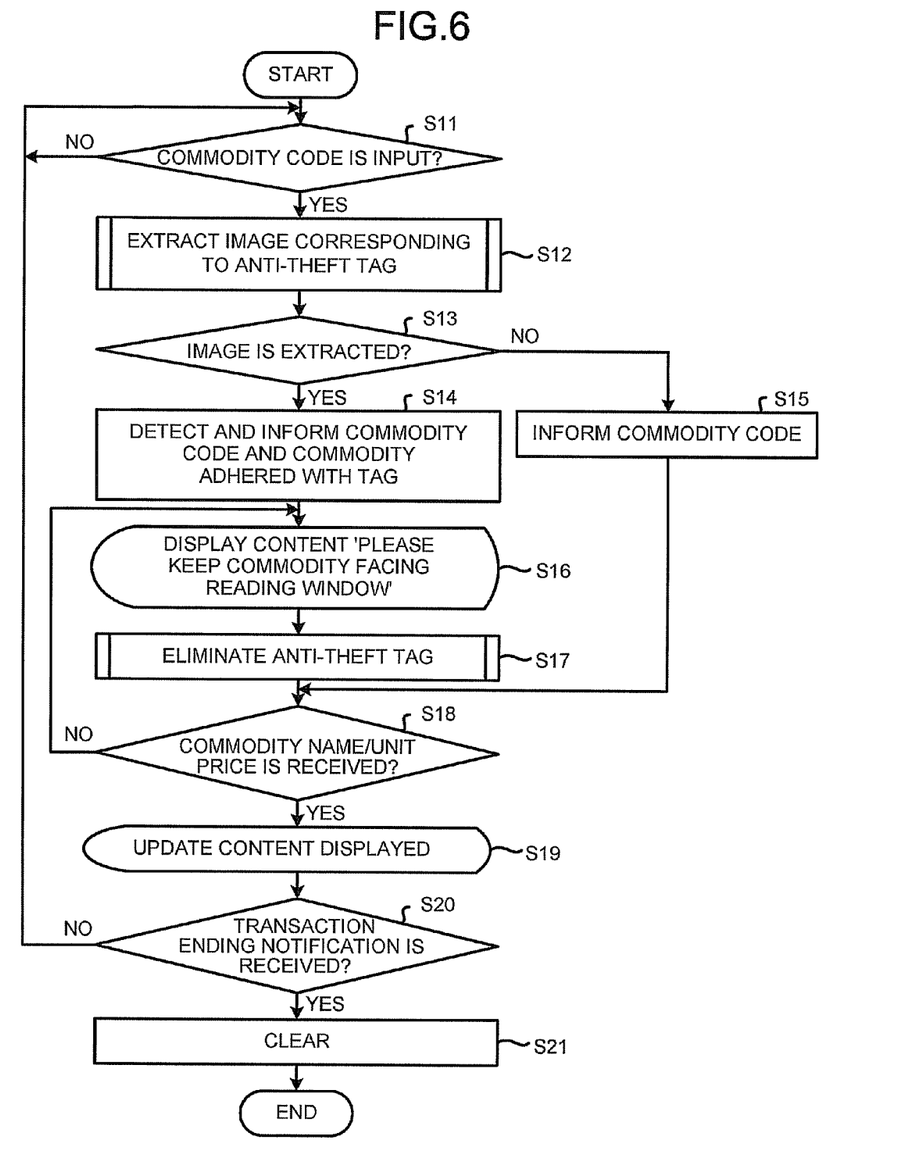
FIG. 6 is a flowchart showing the commodity sales data processing carried out by a code symbol reading apparatus.

FIG. 6 is a flowchart showing the commodity sales data processing carried out by the code symbol reading apparatus.

Figure 7:
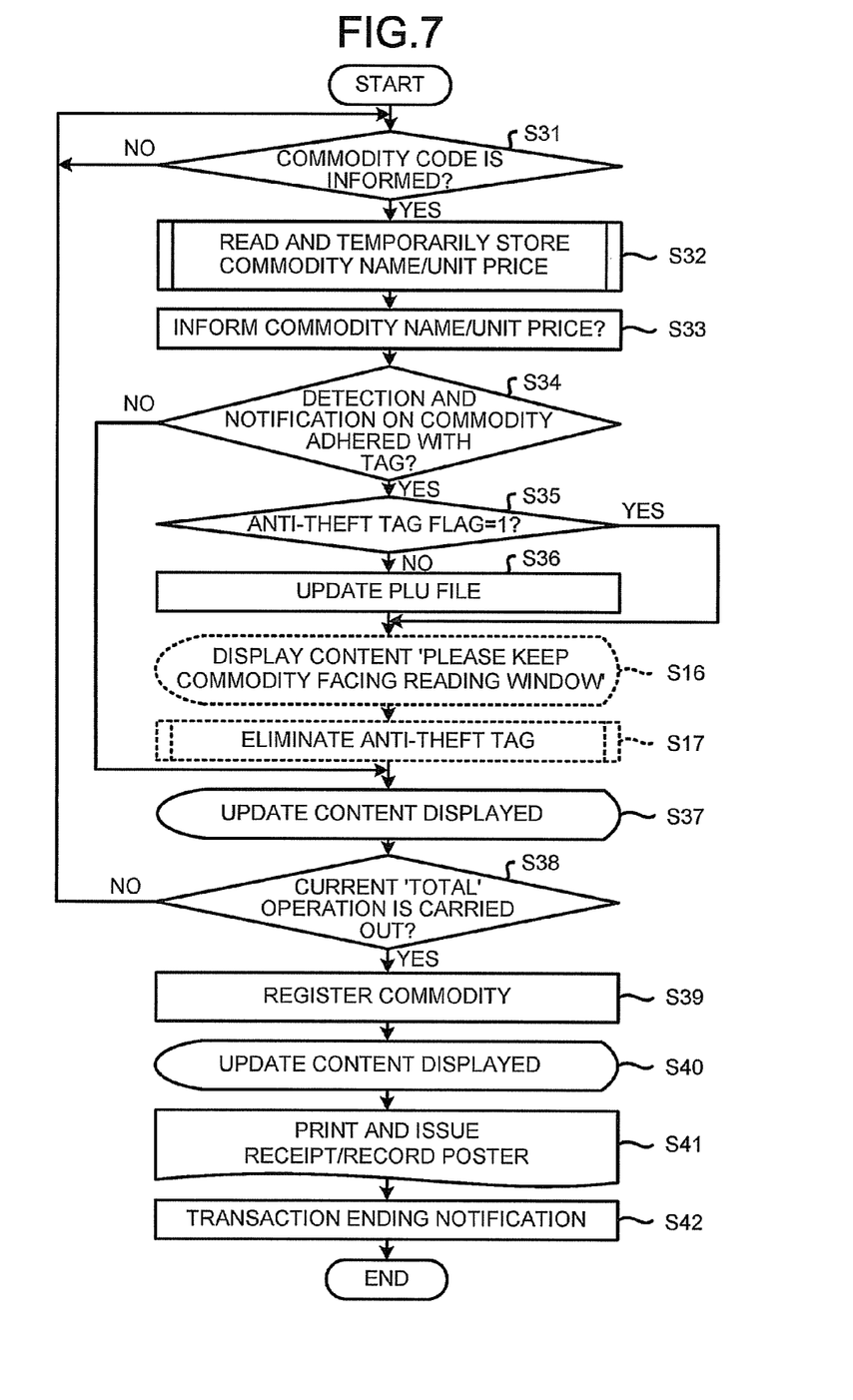
FIG. 7 is a flowchart showing the commodity sales data processing carried out by a POS terminal.

FIG. 7 is a flowchart showing the commodity sales data processing carried out by the POS terminal.

The CPU 161 of the code symbol reading apparatus 101 determines whether or not a commodity code is input from the scanner 103 (Act S11).

The code symbol reading apparatus enters into a standby state if it is determined in Act S11 that no commodity code is input (Act S11: No).

If it is determined in the Act S11 that a commodity code is input (Act S11: Yes), the CPU 161 enables the image recognition processing section of the scanner 103 to extract, from the images corresponding to digital image data, an image representing that the commodity is a commodity adhered with a security tag (Act S12).

Then, the CPU 161 determines whether or not an image representing that the commodity is a commodity adhered with a security tag (an image corresponding to the security tag) is extracted from the images corresponding to the digital image data.

If it is determined in Act S13 that the image corresponding to the security tag is extracted (Act S13: Yes), the CPU 161 informs the POS terminal 11 that the commodity code input from the scanner 103 and the commodity adhered with the tag are detected (Act S14), and the flow turns to Act S16.

If it is determined in Act S13 that the image corresponding to the security tag is not extracted (Act S13: No), the CPU 161 informs the POS terminal 11 of the commodity code input from the scanner 103 (Act S15), and the flow turns to Act S18.

On the other hand, the CPU 51 of the POS terminal 11 determines whether or not the commodity code is informed (Act S31).

The code symbol reading apparatus enters into a standby state if it is determined in Act S31 that no commodity code is informed (Act S31: No).

If it is determined in Act S31 that the commodity code is informed (Act 531: Yes), corresponding commodity name and unit price data are exported from the PLU file 71 based on the informed commodity code and then temporarily stored in the working area of the RAM 53 (Act S32).

Then, the CPU 51 of the POS terminal 11 informs the code symbol reading apparatus 101 of the commodity name and unit price retrieved from the PLU file 71 (Act S33).

In addition, the CPU 51 determines whether or not a content 'a commodity adhered with a tag is detected from the code symbol reading apparatus 101' is informed (Act S34).

If it is determined in Act S34 that the content 'a commodity adhered with a tag is detected' is not informed (Act S34: No), the flow turns to Act 37.

If it is determined in Act S34 that the content 'a commodity adhered with a tag is detected' is informed (Act S34: Yes), the CPU 51 of the POS terminal 11 determines, with reference to the PLU file 71, whether or not the security tag flag corresponding to the input commodity code is 1 (Act S35).

If it is determined in Act S35 that the security tag flag is 1 (Act S35: Yes), the after-mentioned Acts S16 and S17 are executed synchronously, and then the flow turns to Act S37.

If it is determined in Act S35 that the security tag flag is not 1 (Act S35: No), the processing carried out when a commodity adhered with a tag is detected is carried out when the commodity code is input even if the content 'a commodity adhered with a tag is detected' is not informed, thereby updating the PLU file 71 to set the security tag flag corresponding to the commodity code to be 1 (Act S36).

At this time, the code symbol reading apparatus 101 displays, on the display 106, information 'barcode has not been read yet, please keep the commodity facing the reading window 103a' (Act S16).

Then, the operator realizes that the code symbol (commodity code) is not read smoothly and therefore keeps the commodity facing the reading window 103a.

In this manner, the CPU 161 of the code symbol reading apparatus 101 carries out a tag disenabling processing (security tag elimination processing) (Act S17).

Figure 8:
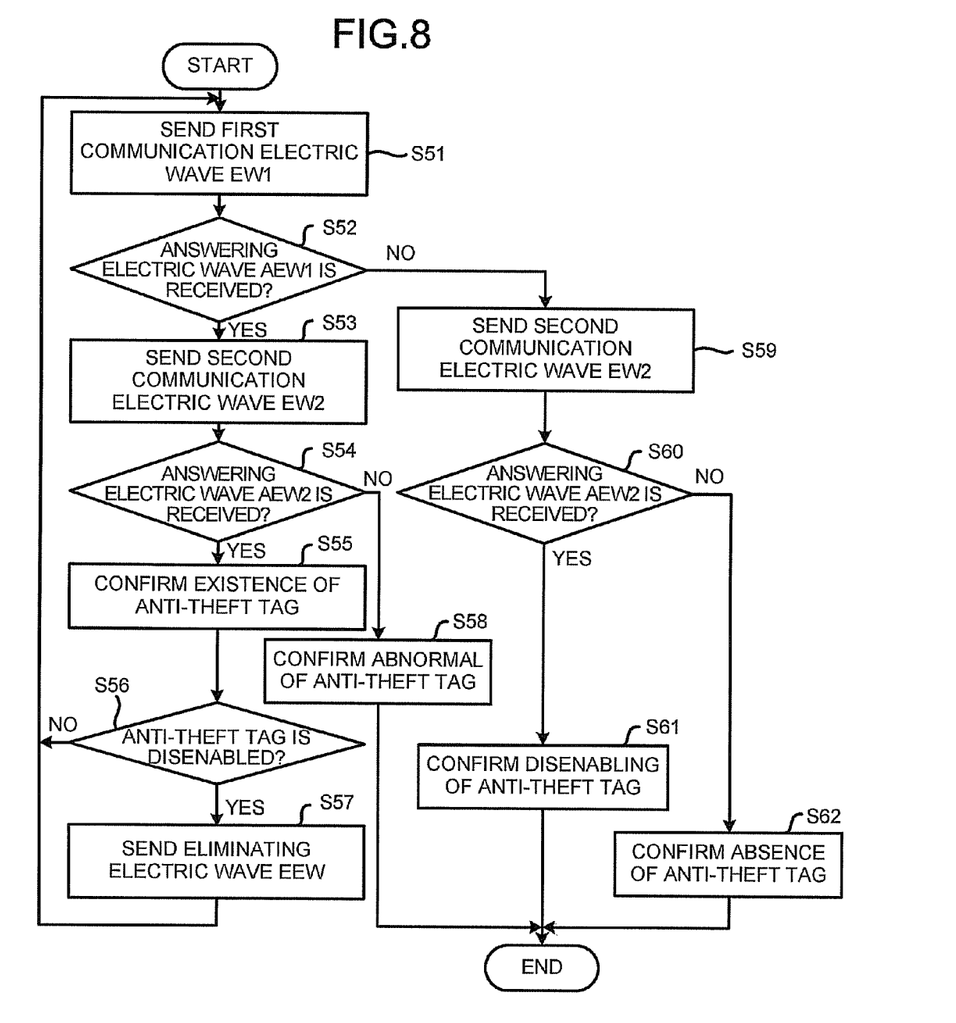
FIG. 8 is a flowchart showing a security tag disenabling processing.

The security tag disenabling processing is described in detail below.

FIG. 8 is a flowchart of the security tag disenabling processing.

The CPU 161 of the code symbol reading apparatus 101 first enables the first communication device 157E1 to send communication electric wave EW1 (Act S51) to detect whether or not answering electric wave AEW1 of a first frequency f1 is sent by the security tag (Act S52).

If it is determined in Act S52 that the security tag sends answering electric wave AEW1 of the first frequency f1 that can be received by the first communication device 157F1 (Act S52: Yes), the second communication device 157F2 sends communication electric wave EW2 (Act S53) to determine whether or not the security tag sends answering electric wave AEW2 of a second frequency f2 (Act S54).

If it is determined in Act S54 that the security tag sends no answering electric wave AEW2 of the second frequency that cannot be received by the second communication device 157F2, the CPU 161 of the code symbol reading apparatus 101 confirms that the security tag is faulted and then ends the security tag elimination processing (Act S57).

If it is determined in Act S54 that the security tag sends answering electric wave AEW2 of the second frequency f2 that can be received by the second communication device 157F2 (Act S54: Yes), the CPU 161 of the code symbol reading apparatus 101 confirms that the security tag is in the effective working range of the eliminating electric wave EEW of the first communication device 157F1 for disenabling the security tag (Act S55) and determines whether or not the security tag is disenabled (Act S56).

If it is determined in Act S56 that the security tag is not disenabled (Act S56: No), the CPU 161 of the code symbol reading apparatus 101 turns to execute S51 and the processing following again.

If it is determined in Act S56 that the security tag is disenabled (Act S56: Yes), the security tag elimination processing is carried out, that is, the first communication device 157F1 outputs the eliminating electric wave EEW for disenabling the security tag to disenable the security tag (Act S57). In this way, the security tag is disenabled appropriately. Moreover, the CPU 161 of the code symbol reading apparatus 101 turns to execute Act S51 so as to confirm the disenabling of the security tag more certainly or to process the next security tag.

On the other hand, if it is determined in Act S52 that the security tag sends no answering electric wave AEW1 of the first frequency f1 that cannot be received by the first communication device 157F1 (Act S52: No), the CPU 161 of the code symbol reading apparatus 101 enables the second communication device 157F2 to send communication electric wave EW2 (Act S53) to determine whether or not the security tag sends answering electric wave AEW2 of the second frequency f2 (Act S59).

If it is determined in Act S59 that the security tag sends answering electric wave AEW2 of the second frequency f2 that can be received by the second communication device 157F2 (Act S59: Yes), the CPU 161 of the code symbol reading apparatus 101 confirms that the security tag is disenabled (Act S60) and then ends the security tag elimination processing. Moreover, at this time, the CPU 161 of the code symbol reading apparatus 101 may inform the POS terminal 11 of the situation above.

If it is determined in Act S59 that the security tag sends no answering electric wave AEW2 of the second frequency f2 that cannot be received by the second communication device 157F2, the CPU 161 of the code symbol reading apparatus 101 considers that the security tag is not in a communicable range, confirms the absence of a security tag, and then ends the security tag elimination processing (Act S61).

Next, the CPU 161 of the code symbol reading apparatus 101 determines whether or not a commodity name and a unit price are received from the POS terminal 11 (Act S18).

If it is determined in Act S18 that neither commodity name nor unit price is received from the POS terminal 11 (Act S18: No), the CPU 161 of the code symbol reading apparatus 101 turns to execute S16 and the processing following.

If it is determined in Act S18 that a commodity name and a unit price are received from the POS terminal 11 (Act S18: Yes), the CPU 161 of the code symbol reading apparatus 101 updates the content displayed to display the commodity name and the unit price on the display 106 and the customer-oriented display 108 (Act S19).

On the other hand, the CPU 51 of the POS terminal 11 may also update the content displayed to display the commodity name and the unit price on the display 15 and the customer-oriented display 17 (Act S37).

Then, the CPU 51 of the POS terminal 11 determines whether or not a current 'total' operation is carried out using the keyboard 14 (Act S38).

Here, as an example of the current 'total' operation, a prepaid amount is input from the keypad after the 'subtotal' key is pressed, and then a prepaid/actual amount key is pressed. The 'subtotal' key, the keypad and the prepaid/actual amount key may be any key on the keyboard 14.

If it is determined in Act S38 that no current 'total' operation is carried out (Act S38 No), the notification on the next commodity code is waited, and the CPU 51 of the POS terminal 11 turns to execute S31 and the processing following again.

If it is determined in Act S38 that the current 'total' operation is carried out (Act S38 Yes), the CPU 51 of the POS terminal 11 carries out a commodity registration by storing the total sales amount data calculated based on the data temporarily stored in the working area of the RAM 53 in the virtual registration area of the RAM 53 (Act S39) and enables the operator-oriented display 15 and the customer-oriented display 17 to update the contented displayed (Act S40).

Then, the CPU 51 of the POS terminal 11 prints the transaction information and issues a receipt using the receipt/journal printer 16 and records a poster using the receipt/journal printer 16 (Act S41).

Next, the CPU 51 of the POS terminal 11 sends a transaction ending notification to the code symbol reading apparatus 101 (Act S12) to end the processing.

On the other hand, the CPU 161 of the code symbol reading apparatus 101 determines whether or not the transaction ending notification is received from the POS terminal 11 (Act S20).

If it is determined in Act S20 that no transaction ending notification is received (Act S20: No), the flow turns to Act S11 again to execute Act S11 and the processing following.

If it is determined in Act S20 that the transaction ending notification is received (Act S20: Yes), the CPU 161 of the code symbol reading apparatus 101 clears the RAM and the content displayed to end the processing.

As stated above, in accordance with this embodiment, the reading of a commodity code, the disenabling (elimination) of the security tag adhered on the commodity the commodity cod of which is read and the confirmation on the disenabling (elimination) may be integrally carried out in an appropriate way.

Thus, the problem that customer is troubled by the alarm sound by the gate (not shown) as the security tag is not disenabled completely is eliminated.

As stated above, in the structure above, an image corresponding to a security tag is extracted. However, the extraction of an image corresponding to a security tag may be saved, and alternatively, the first communication device 157F1 and the second communication device 157F2 determine the existence and the disenabling of a security tag and whether or not the security tag is disenabled.

In this embodiment, the POS terminal or code symbol reading apparatus comprises a control unit such as a CPU, memory devices such as an ROM and an RAM, external memory devices such as an HDD and a CD drive, a display device such as a display and an input device such as a keyboard or a mouse, which constitute the hardware components of an ordinary computer.

The control programs executed by the POS terminal or the code symbol reading apparatus provided in this embodiment may be recorded in a computer-readable recording medium such as CD-ROM, floppy disk (FD), CD-R or DVD (Digital Versatile Disk) as an installable or executable file, or stored in a computer connected with a network such as the Internet to be provided through a network download, or provided or published by a network such as the Internet, or pre-compiled in an ROM to be provided later.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity sales data processing apparatus which carries out a sales data processing for a commodity adhered with a security tag, wherein the security tag includes a first resonant circuit configured to receive an electric wave of a first frequency to resonate and to send an electric wave of the first frequency and wherein the security tag further includes a second resonant circuit configured to receive an electric wave of a second frequency to resonate and to send an electric wave of the second frequency, comprising:
    a determination section configured to determine, based on an imaged image of the commodity, whether or not the commodity is provided with an image display element on which a specific image representing that the commodity is a commodity adhered with a security tag is displayed;
    a first communication device configured to be capable of communicating with the first resonant circuit using the first frequency and disenabling the first resonant circuit;
    a second communication device configured to be capable of communicating with the second resonant circuit using the second frequency; and
    a processing control section, wherein
    in a case that the determination section determines that the commodity is provided with the image display element, the processing control section performs processing of a next commodity when the first communication device cannot communicate with the security tag with which the commodity determined to be provided with the image display element is adhered and the second communication device can communicate with the security tag in a state that the first resonant circuit of the security tag is disenabled by the first communication device.

2. The commodity sales data processing apparatus according to claim 1, further comprising:
    a code symbol reading section configured to read a code symbol for specifying the commodity based on an input image of the commodity; wherein
    the processing control section controls a shift to read the code symbol of the next commodity as the processing of the next commodity.

3. The commodity sales data processing apparatus according to claim 2, further comprising:
    a reporting section configured to report, when both of the first and second communication devices communicate with the security tag for prompting the code symbol reading section to read.

4. The commodity sales data processing apparatus according to claim 1, further comprising:
    a reporting section configured to report that the commodity is a commodity adhered with a security tag when the commodity is determined to be provided with the image display element.

5. A checkout system, comprising:
    an image device configured to image a commodity to output imaged image data; and
    a sales data processing apparatus capable of carrying out a sales data processing for a commodity adhered with a security tag, wherein the security tag comprises a first resonant circuit configured to receive an electric wave of a first frequency to resonate and to send an electric wave of the first frequency and wherein the security tag further comprises a second resonant circuit configured to receive an electric wave of a second frequency to resonate and to send an electric wave of the second frequency, wherein
    the sales data processing apparatus comprising:
    a first communication device capable of communicating with the first resonant circuit using the first frequency and disenabling the first resonant circuit;
    a second communication device capable of communicating with the second resonant circuit using the second frequency;

a determination section configured to determine, based on the imaged image of the commodity, whether or not the commodity is provided with an image display element on which a specific image representing that the commodity is a commodity adhered with a security tag is displayed; and a processing control section, wherein in a case that the determination section determines that the commodity is provided with the image display element, the processing control section performs processing of a next commodity when the first communication device cannot communicate with the security tag with which the commodity determined to be provided with the image display element is adhered and the second communication device communicates with the security tag in a state that the first resonant circuit of the security tag is disenabled by the first communication device.

6. A control method of a sales data processing apparatus capable of carrying out a sales data processing for a commodity adhered with a security tag, wherein the security tag comprises a first resonant circuit configured to receive a first electric wave of a first frequency to resonate and to send a second electric wave of the first frequency and wherein the security tag further comprises a second resonant circuit configured to receive a first electric wave of a second frequency to resonate and to send a second electric wave of the second frequency, the control method comprising:

determining, based on the imaged image of the commodity, whether or not the commodity is provided with an image display element on which a specific image representing that the commodity is a commodity adhered with a security tag is displayed; and in a case where the commodity is determined to be provided with the image display element, performing processing of a next commodity when the first communication device cannot communicate with the security tag with which the commodity determined to be provided with the image display element is adhered and the second communication device can communicate with the security tag in a state that the first resonant circuit of the security tag is disenabled by the first communication device.

* * * * *